Figure 1:
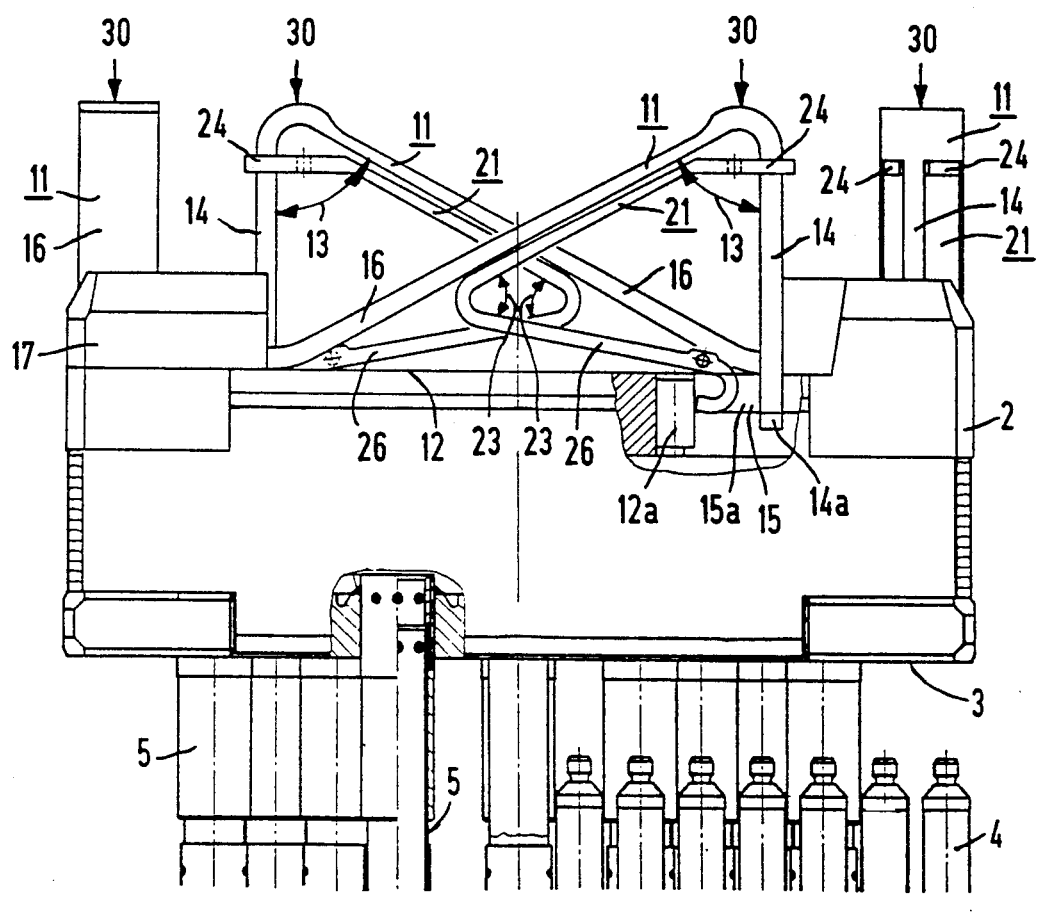

United States Patent [19]

Beuerlein

[11] Patent Number: 5,276,721

[45] Date of Patent: Jan. 4, 1994

[54] NUCLEAR REACTOR FUEL ASSEMBLY

[75] Inventor: Bernd Beuerlein, Erlangen, Fed. Rep. of Germany

[73] Assignee: Siemens Aktiengesellschaft, Munich, Fed. Rep. of Germany

[21] Appl. No.: 937,549

[22] Filed: Aug. 28, 1992

[30] Foreign Application Priority Data

Aug. 28, 1991 [EP]  European Pat. Off. ........ 91114474.9

[51] Int. Cl.$^5$ .............................................. G21C 3/32
[52] U.S. Cl. ................................... 376/446; 376/364; 376/448
[58] Field of Search ............... 376/446, 448, 451, 364; 976/DIG.

[56] References Cited

U.S. PATENT DOCUMENTS

| | | | |
|---|---|---|---|
| 4,645,642 | 2/1987 | Leclercq et al. | 376/364 |
| 4,792,429 | 12/1988 | Hatfield | 376/446 |
| 4,861,545 | 8/1989 | Lippert | 376/448 |
| 4,986,960 | 1/1991 | Larson | 376/446 |
| 5,053,191 | 10/1991 | Bryan et al. | 376/446 |

FOREIGN PATENT DOCUMENTS 62-102186  5/1987  Japan .
3039693  5/1991  Japan .

Primary Examiner—Donald P. Walsh
Assistant Examiner—Meena Chelliah
Attorney, Agent, or Firm—Herbert L. Lerner; Laurence A. Greenberg

[57] ABSTRACT

A nuclear reactor fuel assembly includes two end plates having inner and outer surfaces Elongated, nuclear fuel-filled fuel rods are disposed between the inner surfaces and have longitudinal axes perpendicular to the inner surfaces. A leaf spring is disposed on the outer surface of one of the end plates and is bent at an acute angle defining first and second legs. The first leg is substantially perpendicular to the outer surface of the one end plate and loosely engaged in an elongated guide groove formed in the one end plate. The second leg meets the outer surface of the one end plate at an acute angle and has an end rigidly secured to the outer surface of the one end plate. The first and second legs and the guide groove have longitudinal orientations together defining a plane. A supplementary spring is bent at an acute angle and disposed between the legs of the leaf spring. The supplementary spring has one end loosely engaged in the guide groove and another end loosely guided on the first leg of the leaf spring.

2 Claims, 2 Drawing Sheets

NUCLEAR REACTOR FUEL ASSEMBLY

The invention relates to a nuclear reactor fuel assembly, having two end plates with inner and outer surfaces, elongated fuel rods being filled with nuclear fuel, being disposed between the inner surfaces and having longitudinal axes perpendicular to the inner surfaces, and a leaf spring disposed on the outer surface of one end plate and bent at an acute angle, the leaf spring having a first leg substantially perpendicular to the outer surface of the one end plate and loosely engaged in an elongated guide groove in the one end plate, and a second leg having a longitudinal orientation defining a plane along with the longitudinal orientation of the first leg and the longitudinal orientation of the guide groove, the second leg meeting the outer surface of the one end plate at an acute angle and being rigidly secured by an end of the second leg to the outer surface of the one end plate.

The structure described above is a conventional kind of fuel assembly. It is disposed in a nuclear reactor with the fuel rods oriented vertically. The lower end plate rests on a lower core grid inside the nuclear reactor, while an upper core grid plate, that is parallel to the lower core grid plate, rests on the leaf spring, at the apex of the acute angle formed by the leaf spring, and the fuel assembly presses against the lower core grid plate, deforming the leaf spring. Such a construction gives the fuel assembly a resiliently stable seat between the lower and upper core grid plates.

In the nuclear reactor, the fuel assembly experiences a flow of coolant longitudinally from bottom to top, and the fuel assembly then has a tendency to float in the flow. Its floating is prevented by the force of the leaf spring on the outer surface of the upper end plate of the fuel assembly.

However, a coolant flow through the fuel assembly that considerably increases the tendency of the fuel assembly to float can occur later, as a result of later changes in the external primary system that follows the nuclear reactor. Under some circumstances, the spring force exerted on the fuel assembly by the leaf spring may then no longer be adequate to prevent such floating.

It is accordingly an object of the invention to provide a nuclear reactor fuel assembly, which overcomes the hereinafore-mentioned disadvantages of the heretofore-known devices of this general type and which does so in such a way that it is prevented from floating even in intensified coolant flows inside a nuclear reactor.

With the foregoing and other objects in view there is provided, in accordance with the invention, a nuclear reactor fuel assembly, comprising two end plates having inner and outer surfaces; elongated, nuclear fuel-filled fuel rods being disposed between the inner surfaces and having longitudinal axes perpendicular to the inner surfaces; a leaf spring being disposed on the outer surface of one of the end plates and being bent at an acute angle defining first and second legs, the first leg being substantially perpendicular to the outer surface of the one end plate and loosely engaged in an elongated guide groove formed in the one end plate, the second leg meeting the outer surface of the one end plate at an acute angle and having an end rigidly secured to the outer surface of the one end plate, the first and second legs and the guide groove having longitudinal orientations together defining a plane; and a supplementary spring being bent at an acute angle and disposed between the legs of the leaf spring, the supplementary spring having one end loosely engaged in the guide groove and another end is loosely guided on the first leg of the leaf spring.

The supplementary leaf spring acts parallel to the leaf spring and thus reinforces the spring force acting counter to the flow of the coolant in the nuclear reactor.

The supplementary spring is also especially well-suited for retrofitting fuel assemblies that are already in use in a nuclear reactor.

Other features which are considered as characteristic for the invention are set forth in the appended claims.

Although the invention is illustrated and described herein as embodied in a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
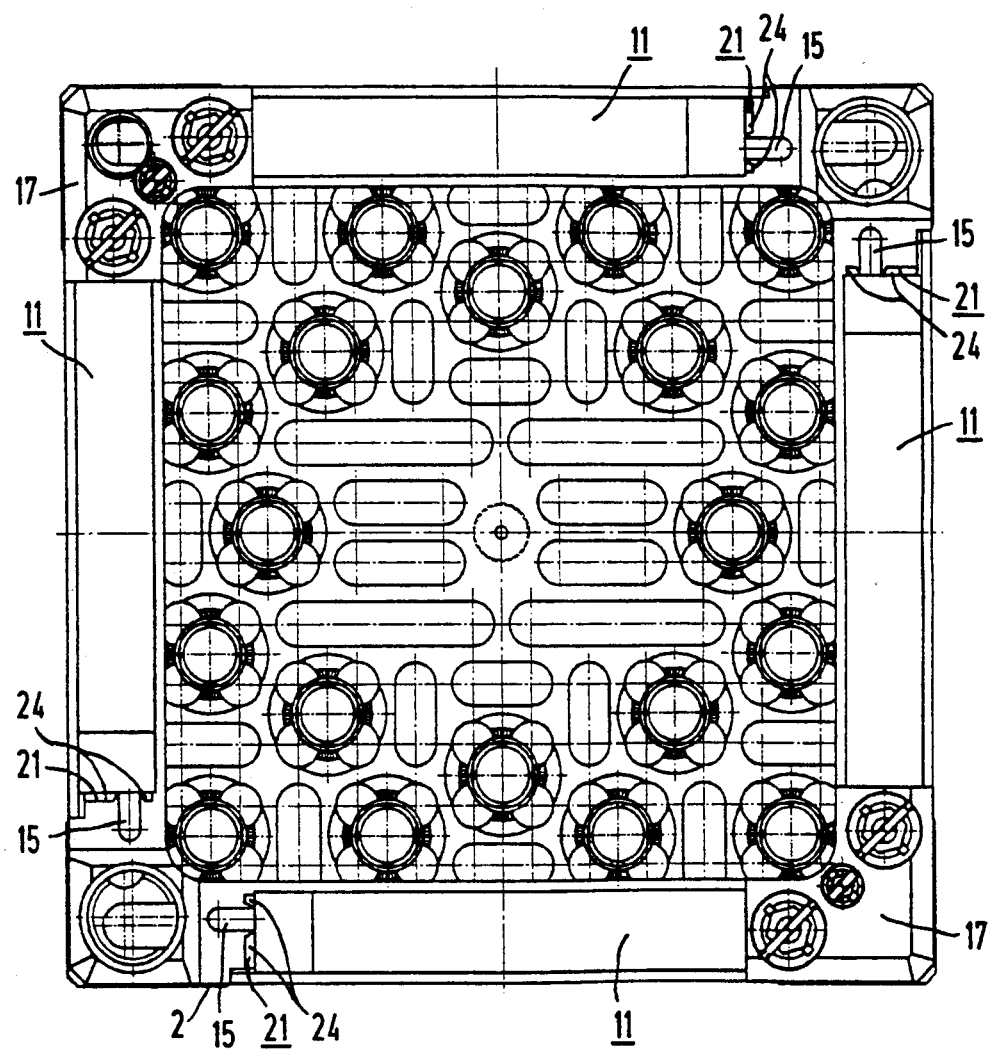

FIG. 1 is a fragmentary, diagrammatic, partly broken-away and partly sectional side-elevational view of an upper end plate of a nuclear reactor fuel assembly; and FIG. 2 is a top-plan view of the upper end plate of FIG. 1.

Referring now in detail to FIGS. 1 and 2 of the drawing as a whole, there are seen fuel rods 4 which are disposed at an inside or inner surface 3 of an upper end plate 2, are filled with nuclear fuel, and have longitudinal axes at right angles to the inner surface 3 of the upper grid plate 2. While ends of these fuel rods 4 are spaced apart from the inner surface 3, control rod guide tubes 5, which are parallel to the fuel rods 4, are firmly screwed to both the inner surface 3 of the upper end plate 2 and the inner surface of a non-illustrated lower end plate. At the lower end plate, the ends of the fuel rods 4 are likewise spaced apart from the inner surface of the lower end plate. The control rod guide tubes 5 are each guided through a hole or space in non-illustrated gridlike spacers, which are located between the two end plates and are form-lockingly secured to individual control rod guide tubes. A form-locking connection is one which connects two elements together due to the shape of the elements themselves, as opposed to a force-locking connection, which locks the elements together by force external to the elements. Each fuel rod 4 is likewise extended through one hole of the gridlike spacer and is retained force-lockingly inside this hole with the aid of compression springs.

The upper end plate 2 is square in cross section, and one leaf spring 11 is assigned to each edge of an outside or outer surface 12 of the upper end plate 2. A leaf spring 11 of this kind is bent at an acute angle 13. A first leg 14 of the leaf spring 11 rests perpendicularly on the outer surface 12 of the end plate 2, where it loosely engages an elongated guide groove 15 in the outer surface 12. The longitudinal direction of this guide groove 15 is parallel to the edge of the outer surface 12 on which the leaf spring 11 is located. An end of a second leg 16 of the leaf spring 11 meets the outer surface 12 of the upper end plate 2 at an acute angle. This end of the second leg 16 is fastened between the outer surface 12 and an angle element 17 firmly screwed to the outer surface 12, and is thus rigidly retained. The two legs 14 and 16 define a plane that is parallel to the edge of the outer surface 12 on which the leaf spring 11 is located. This plane is also perpendicular to the outer surface 12.

A supplementary leaf spring 21 is likewise bent at an acute angle 23 and is disposed between the two legs 14 and 16 of the leaf spring 11. One end 24 of the supplementary leaf spring 21 has a fork which fits loosely around the leg 14 of the leaf spring 11. Another end 26 of the supplementary leaf spring 21 is bent outward in hooklike fashion in the plane defined by the legs 14 and 16 and is reduced to the width of the leg 14 of the leaf spring 11. With this end 26 bent in hooklike fashion, the supplementary leaf spring loosely engages the elongated guide groove 15.

In order to install the leaf spring 11, its first leg 14, which has a crosswise strut 14a on its end, is first inserted by that end into the guide groove 15 through an insertion bore 12a and moved away from the insertion bore 12a, so that the crosswise strut 14a fits behind a shoulder 15a that narrows the guide groove 15 at the top of the outer surface 12. The second leg 16 of the leaf spring 11 is then rigidly secured to the outer surface 12 of the upper end plate 2 by screwing the angle element 17 onto the outer surface 12. This produces prestressing of the spring 11.

In order to install the supplementary leaf spring 21, it is prestressed by narrowing the distance between its two legs having the ends 24 and 26. This accordingly prestressed supplementary leaf spring 21 is then inserted between the leg 16 of the leaf spring 11 and the outer surface 12 of the upper end plate 2. Next, the two legs having the ends 24 and 26 are freed so that the end 26 which is curved in hooklike fashion locks into place between the shoulders 15a of the elongated guide groove 15, and the leg 14 of the leaf spring 11 locks into place inside the fork at the end 24 of the supplementary leaf spring 21.

Arrows 30 symbolize forces with which an upper core grid plate in a nuclear reactor presses the fuel assembly against a lower core grid plate in the direction of the longitudinal axes of the fuel rods 4. Under the influence of these forces, the leg 14 of each of the four leaf springs 11 in the applicable guide groove 15 moves away from the end of the other leg 16 of the applicable leaf spring 11 that is rigidly secured to the outer surface 12, thereby increasing the prestressing of the applicable leaf spring 11. At the same time, there is a decrease in the spacing between the legs of the supplementary leaf springs 21 having the ends 24 and 26. As a result, these springs are prestressed as well and they act with their spring force parallel to the spring force of the leaf springs 11.

I claim:

1. A nuclear reactor fuel assembly, comprising:
   two end plates having inner and outer surfaces;
   elongated, nuclear fuel-filled fuel rods being disposed between said inner surfaces and having longitudinal axes perpendicular to said inner surfaces;
   a leaf spring being disposed on said outer surface of one of said end plates and being bent at an acute angle defining first and second legs,
   said first leg being substantially perpendicular to said outer surface of said one end plate and loosely engaged in an elongated guide groove formed in said one end plate,
   said second leg meeting said outer surface of said one end plate at an acute angle and having an end rigidly secured to said outer surface of said one end plate,
   said first and second legs and said guide groove having longitudinal orientations together defining a plane; and
   a supplementary spring being bent at an acute angle and disposed between said legs of said leaf spring, said supplementary spring having one end loosely engaged in said guide groove and another end loosely guided on said first leg of said leaf spring.

2. In a nuclear reactor fuel assembly having two end plates with inner and outer surfaces, a resilient seat for the end plates comprising:
   a leaf spring being disposed on the outer surface of one of the end plates and being bent at an acute angle defining first and second legs,
   said first leg being substantially perpendicular to the outer surface of the one end plate and loosely engaged in an elongated guide groove formed in the one end plate,
   said second leg meeting the outer surface of said one end plate at an acute angle and having an end rigidly secured to the outer surface of the one end plate,
   said first and second legs and said guide groove having longitudinal orientations together defining a plane; and
   a supplementary spring being bent at an acute angle and disposed between said legs of said leaf spring, said supplementary spring having one end loosely engaged in said guide groove and another end loosely guided on said first leg of said leaf spring.

* * * * *